May 1, 1951           G. W. BATCHELL           2,551,311

METHOD OF SHAPING AND ANNEALING GLASS ARTICLES

Original Filed Sept. 9, 1943           9 Sheets-Sheet 2

Fig 4

Inventor
George W. Batchell
By Freeman Crompton
Attorney

May 1, 1951 G. W. BATCHELL 2,551,311
METHOD OF SHAPING AND ANNEALING GLASS ARTICLES
Original Filed Sept. 9, 1943 9 Sheets-Sheet 3

Inventor
George W. Batchell
By [signature]
Attorney

May 1, 1951 G. W. BATCHELL 2,551,311
METHOD OF SHAPING AND ANNEALING GLASS ARTICLES
Original Filed Sept. 9, 1943 9 Sheets-Sheet 6

May 1, 1951        G. W. BATCHELL        2,551,311
METHOD OF SHAPING AND ANNEALING GLASS ARTICLES
Original Filed Sept. 9, 1943        9 Sheets-Sheet 7

Fig.13

Inventor
George W. Batchell
By Ileeman Crampton
Attorney

Fig 14

Patented May 1, 1951

2,551,311

UNITED STATES PATENT OFFICE 2,551,311

METHOD OF SHAPING AND ANNEALING GLASS ARTICLES

George W. Batchell, Toledo, Ohio, assignor to Toledo Engineering Company, Inc., Toledo, Ohio, a corporation of Ohio Continuation of application Serial No. 501,632, September 9, 1943. This application August 26, 1948, Serial No. 46,302

7 Claims. (Cl. 49—84)

My invention has for its object to teach a novel method of hot working and forming thermoplastic articles, such as glass bodies from glass blanks. By the use of my invention, a glass blank formed, in part, to a desired ultimate shape is first heat saturated to remove internal strains and rendered pliable, secondly, the blank is hot worked or shaped by positive mating dies and then the resulting shaped ware is further heat treated for a required period to produce complete annealing and subsequently to a gradual cooling thereof to retain an annealed condition the rendering of the blank pliable and annealing of the shaped blank continuing without interruption during the time period of blank shaping.

The invention also has for its object to provide a novel method for shaping and heat treating blanks during their progressive movement thereof in a production line.

The invention also consists of other features which will appear from the following description and upon examination of the drawings and as presented in the claims hereinafter appended.

This application is a continuation of the now abandoned application Serial No. 501,632 filed September 9, 1943, in the Patent Office, for an Apparatus and Method for Shaping and Tempering Glass Articles, which was a continuation in part of the now abandoned application Serial No. 454,806 filed August 16, 1942, in the Patent Office, for an Apparatus and Method for Shaping and Tempering Glass Articles.

The leer structure

The leer 1 shown in the drawings has a frame 2. The frame comprises joined and interrelated beams 3 and plates 4. The frame 2 supports a plurality of refractory blocks, in a manner well known in the art, to form a tunnel 6.

The tunnel 6 comprises a bottom channel shaped part 32 extending the entire length of the leer 1 and a substantially flat top part 33 supported in spaced relation to the upper edges of the bottom part 32. The top part 33 and the said upper edges of the bottom part 32 define a pair of slots 34 in the opposite side walls of the tunnel 6 and extending through the entire length of the leer 1.

Intermediate the ends of the tunnel 6, a wall 29, formed of refractory block material, extends vertically upwardly for a short distance from the bottom of the tunnel 6. The wall 29 is preferably of a substantial thickness and is adapted to prevent substantial heat exchange between the air in the tunnel 6 on opposite sides of the wall 29. The wall 29 has a flat upper edge spaced downwardly from the line of the slots 34 a distance sufficient to allow articles conveyed through the tunnel, in a manner hereafter to be described, to pass over the wall without contact with the wall 29. The wall 29 has oppositely facing surfaces which divide the tunnel 6 into the two zones 15 and 30 and provides an intermediate zone 31 above the top edge of the wall 29 and between said surfaces. The zone 15 extends from the inlet end of the tunnel 6 to one surface of the wall 29 and the zone 30 extends from the opposite surface of the wall 29 to the outlet end of the tunnel 6. The wall 29 provides a baffle wall which together with the surfaces of the blanks conveyed through the tunnel 6 prevents circulation of air between the zones and causes a current of hot air to move upwardly, along the surface of the wall 29 facing the zone 15, into the enclosure now to be described.

Above the zone 15 and proximate to the disposition of the wall 29 in the tunnel 6, an enclosure is formed, for housing a glass shaping mechanism to be hereinafter described. The housing has inner side walls 19 and outer insulating side walls 23 and a top wall 11. The housing communicates through its open bottom with the tunnel 6 and provides a way through which a transfer mechanism to be hereinafter described may operate.

In order to provide for a cooling portion 39 of zone 30, a plurality of louvres 10 are provided in the top wall of the tunnel 6. The louvres 10 are adapted to operate in a manner well known in the art allowing distribution of heated air from the zone 30 to the outside of the leer and thus drawing cooling air into the outlet end of the tunnel 6 to decrease the air temperature in the zone 30.

Below the tunnel 6 is provided a lower passageway 12 which extends from one to the other end of the leer and provides a way through which a return carrier mechanism to be hereinafter described may operate.

Tunnel heating means

The air within the tunnel 6 is heated and maintained at desired temperatures by means of suitable burners 22. The burners 22 are connected by a pipe 28 to a source of supply of gas. The burners direct their flames into relatively closely positioned metal cylinders 24. The cylinders 24 are located in proximity to and extend crosswise of the bottom of the zone 15 of the tunnel 6 and a portion of the zone 30 between the wall 29 and cooling portion 39 of the zone 30.

The exhaust products of combustion within the cylinders 24 are withdrawn by suitable draft pipes 25 and 27. The pipes 25 and 27 connect the cylinders 24 with a suitable stack flue 26 to produce a required draft within the cylinders 24.

The heat produced within and radiated by the cylinders 24 may be adjusted individually by suitable valves controlling the supply of fuel gas to the burners 22 or by suitable valves in the exhaust line adapted to vary the stack draft from the cylinders 24, all in a manner well known in the art.

It is my purpose that the cylinders 24 below the zone 15 of the tunnel 6, by adjustment of the fuel supply thereto, the exhaust therefrom or by both adjustments, shall give off sufficient heat to raise the temperature of the air within the tunnel 6 and enclosure housing formed by walls 19 to a high degree. Thus, the zone 15 may be readily referred to hereinafter as a high heat zone or a zone of high heat.

The temperature of the air in the high heat zone 15 and said housing is required to be of a degree that when glass blanks are introduced into and conveyed through the zone 15 portion of tunnel 6, by a conveying mechanism, to be hereinafter described, the blanks as they are brought into proximity to said housing will be subjected to a gradually increasing temperature to establish a uniform high temperature in all portions of the glass blank enabling relaxation of all stressed parts of the blank and to render the blank pliable to shaping by a shaping mechanism disposed in said housing and hereinafter described.

The cylinders 24 in proximity to the zone 30 portion of the tunnel 6 are adjusted to produce an annealing air temperature within the zone 30 and thus said zone 30 may be referred to as the annealing zone. The operation of the louvres 10, previously described, in diluting the air within the zone 30 and particularly the portion 39 thereof cooperate in producing the desired annealing atmosphere in a manner well known in the art.

In the adjustment of the heat radiated by cylinders 24 in the high heat zone 15 and the annealing zone 30 as modified by the louvres 10, it is a matter of some importance that the heat absorbed by the wall 29 dividing the zones 15 and 30 from the air in each zone shall produce, by radiation of said wall 29, an intermediate zone 31 above the top edge of the wall 29 and between the two opposite surfaces thereof, in which the temperature of the air decreases but only slightly as for example 5° from the temperature of the high heat zone 15, as measured progressively across the top edge of the wall 29 starting from the face of wall 29 in zone 15 to the face of said wall in zone 30. Thus, the temperatures of each zone 15 and 30 are maintained so that, with losses to the atmosphere, temperatures will prevail at the respectively adjacent ends of zones 15 and 30 proximate to the wall having about a 5° differential in temperature.

The conveying mechanism

In order to convey a glass blank 9 through the tunnel 6 and the zones 15, 31 and 30 thereof, a conveying mechanism comprising a pair of link belt chains 7 is provided. The chains 7 cooperate with a plurality of blank supporting carriers 8 in a manner hereinafter explained.

Each chain 7 is of a length so that its catenary portions extend the full length of the leer 1 and between two sprockets 20 and 20'. Each sprocket is located at one of the opposite ends of the leer, one of the sprockets being motor driven. The sprockets 20 and 20' of each chain 7 located at one end of the leer 1 are connected together by suitable counter-shafting so that the sprockets of both belt chains rotate as a unit to move both chains 7 synchronously. The sprockets 20 and 20' are rotated in a direction to cause the upper catenary portions of the chains to move linearly in a direction inwardly of one end of the leer through zone 15, the intermediate zone 31 over the wall 29 and through zone 30 and portion 39 thereof to the outlet end of the leer 1.

A pair of channel bars 21 is provided, each of which is supported on one of opposite sides of and exterior to the tunnel 6 extending along a line substantially coinciding with the lower edge of the slot 34. Each channel bar provides a track on which the upper catenary portion of each chain 7 may ride. Preferably the chain 7 has rollers 60 connected thereto which are adapted to ride in the tracks supplied by the channel bars 21. Thus, in the rotation of the sprockets 20 and 20' the upper catenary portions of the chains 7 move continuously along the tracks on the channel bars 21 from the inlet toward the outlet of the leer and provide means for supporting the carriers 8.

The carriers 8 are each formed to have an upper cross bar 35 whose projecting opposite ends 38 are adapted to extend through opposite slots 34 in the tunnel 6 and be engaged and supported by the upper catenary portions of the two moving chains 7. If desired, the chains 7 may have suitable yokes 36 for receiving said ends 38 and retaining the same against lateral movement relative to the chains.

Each carrier 8 has a pair of parallel side rods 37 connected to and depending from the cross bar 35. The rods 37 are each provided with elastic blank engaging elements 40 and 41. The elements 40 and 41 are adapted to yield and readily adjust themselves to accommodate bending of the blank 9 in the shaping mechanism, hereinafter described, without loss of supporting control over the blank. The lower blank engaging elements 41 have seats 42 preferably formed of flat pieces of refractory metal.

Thus, it will be seen that if the blank 9 is placed in a frame 8 and the frame placed with its ends 38 in the yokes 36 of opposite chains 7, the blank 9 and frame 8 will be conveyed into the inlet end of the leer 1 and through the tunnel 6 over the wall 29 and out through the discharge or outlet end of the leer.

The glass shaping mechanism

In order to shape the blanks 9 in the course of their movement through the leer 1, I provide a glass shaping mechanism 14 in the housing formed by the walls 19 and 23 and the top wall 11, previously described. The glass shaping mechanism includes a pair of die elements 17 and 18 and means for operatively opening and closing them. Preferably, the element 18 is held stationary in the housing well above the plane of movement of a carrier cross bar 35 supported on the chains 7. Hence, in order that a blank 9 may be positioned for engagement with the die element 18, the carrier 8 and blank 9 must be lifted up from the chains 7 a distance that the blank and carrier are both clear of the chains 7 and the carriers and blanks supported on the chains which are sequentially approaching the station of the glass shaping mechanism. The carrier 8 and blank 9 are so moved by a transfer mechanism, hereinafter described.

The die element 17 is supported for reciprocatory opening and closing movements relative to the element 18 in suitable ways formed in opposite walls 19 of the housing enclosing the glass forming mechanism. The element 17 is caused to move by cross head joined rocker arms or levers 100. Each lever 100 is pivotally mounted on one of said walls 19 in the space between said wall and wall 23. Each lever 100 is suitably connected at one end to the die element 17 and at the other end through said cross head to a pivotal link. The link is pivotally connected to the piston rod of a cylinder 98 of a hydraulic motor means. Thus, as fluid is introduced into the cylinder 98 to move the piston rod outwardly with respect thereto, the die 17 will be actuated through linkage, including rocker arms 100, to close on the die element 18 shaping a blank therebetween. When the introduction of fluid to cylinder 98 is reversed, the die 17 will be actuated to move away from the die 18 allowing removal of the shaped blank.

If desired, the rocker arms 100 may extend through slots formed in a heat insulating cover 101 which forms a chamber between walls 19 and 23 preventing infiltration of cooling air or exhaust of heated air from within the housing through the slots in wall 19 providing ways for guiding the reciprocation of die element 17.

It is my purpose that the atmosphere surrounding the die elements 17 and 18 and the elements themselves shall be maintained at the highest temperature prevailing in the high heat zone 15. The temperature is such that the blank 9 is rendered pliable and amenable to pressure formation but not so high that the blank loses general character and blank shape and becomes a molten mass of indeterminate form.

The transfer mechanism

Figures 8, 9:
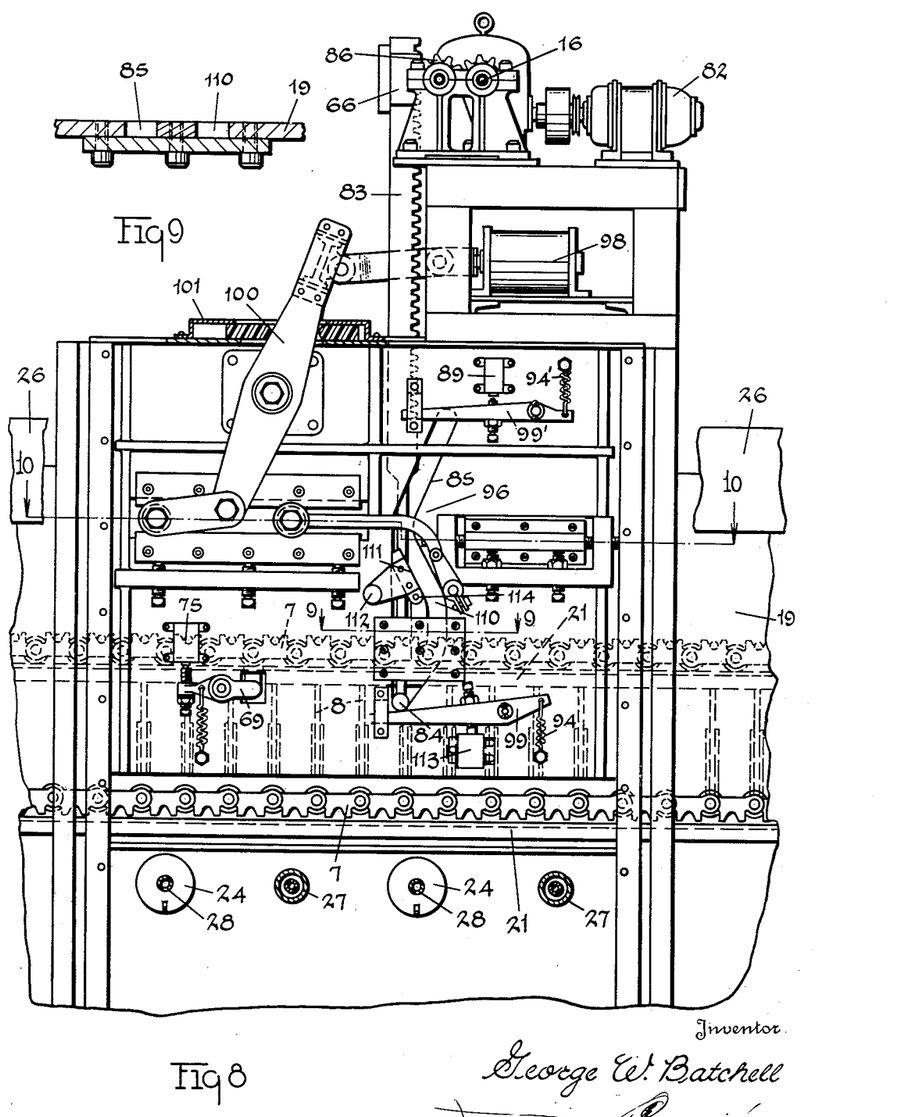
Fig. 8 is a side view of the transferring and reshaping mechanism within the heat zone of the leer.
Fig. 9 is an enlarged view of a section taken on the plane of the line 9—9 indicated in Fig. 8.
Figure 10:
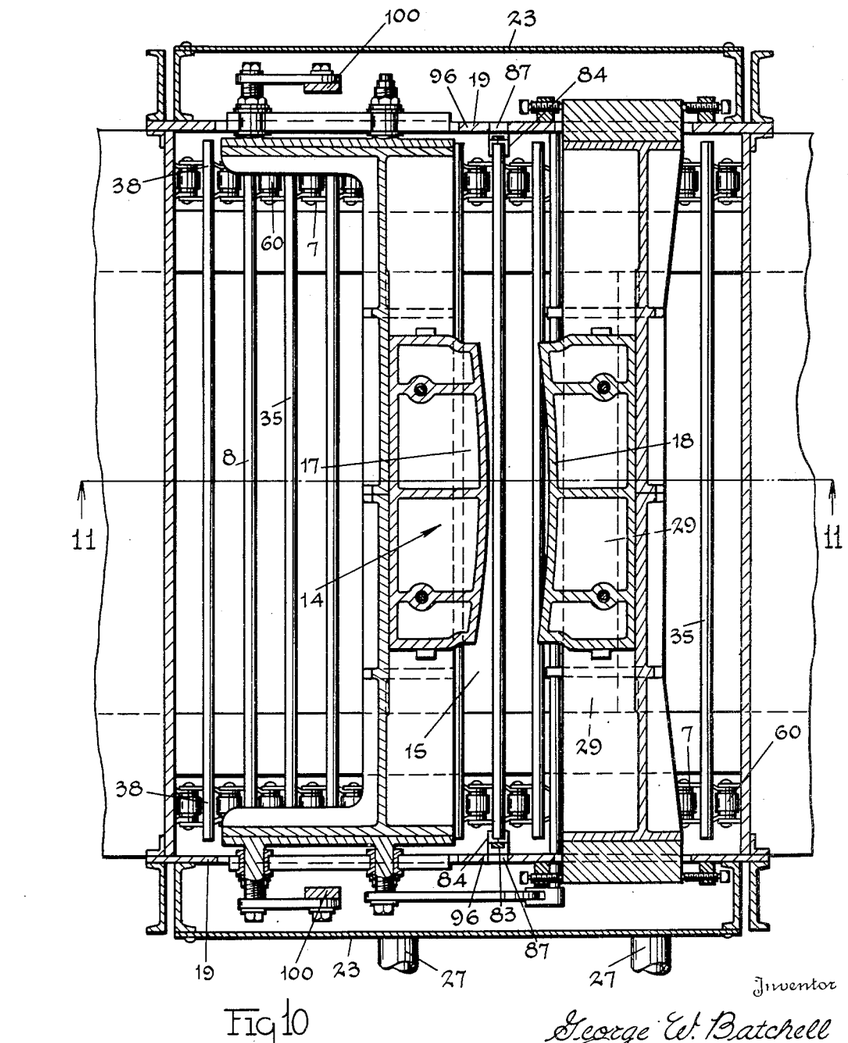
Fig. 10 is a view of a section taken on the plane of the line 10—10 indicated in Fig. 8.
Figures 11, 12:
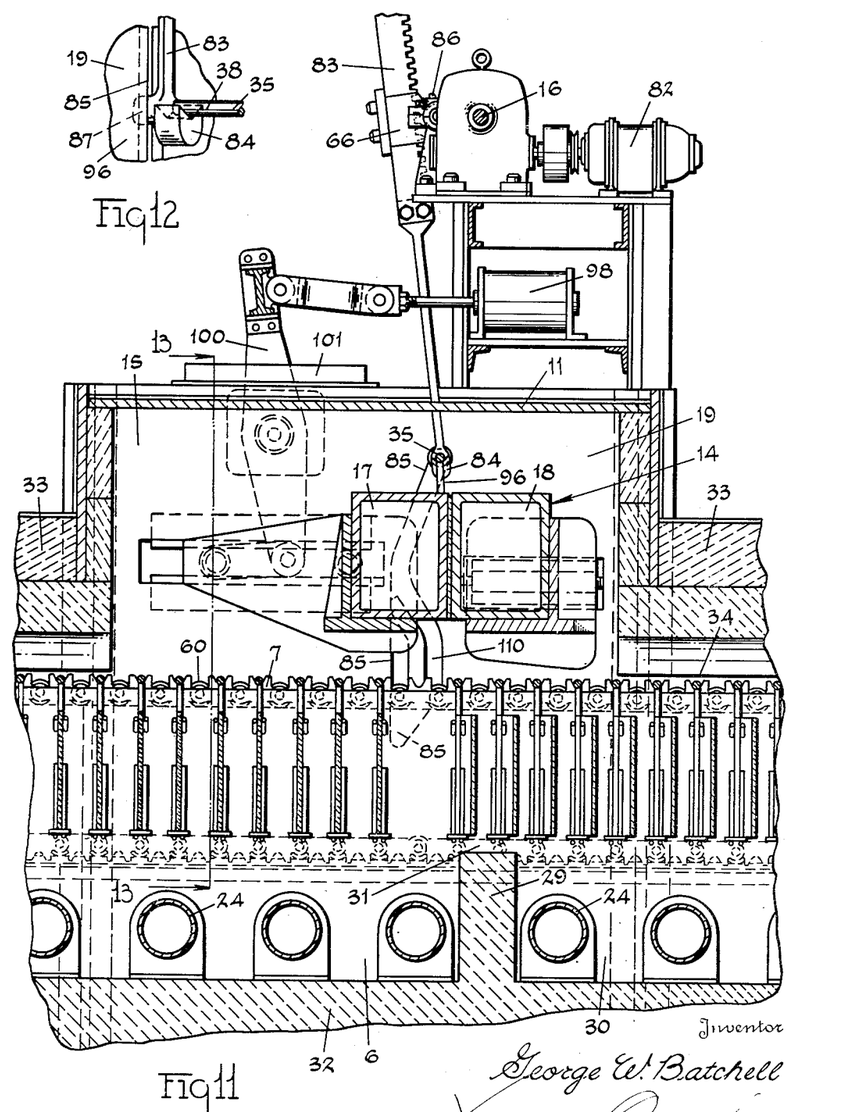
Fig. 11 is a view of a section taken on the plane of line 11—11 indicated in Fig. 10.
Fig. 12 is a perspective view of the carrier supporting head of the transferring mechanism.
Figure 13:
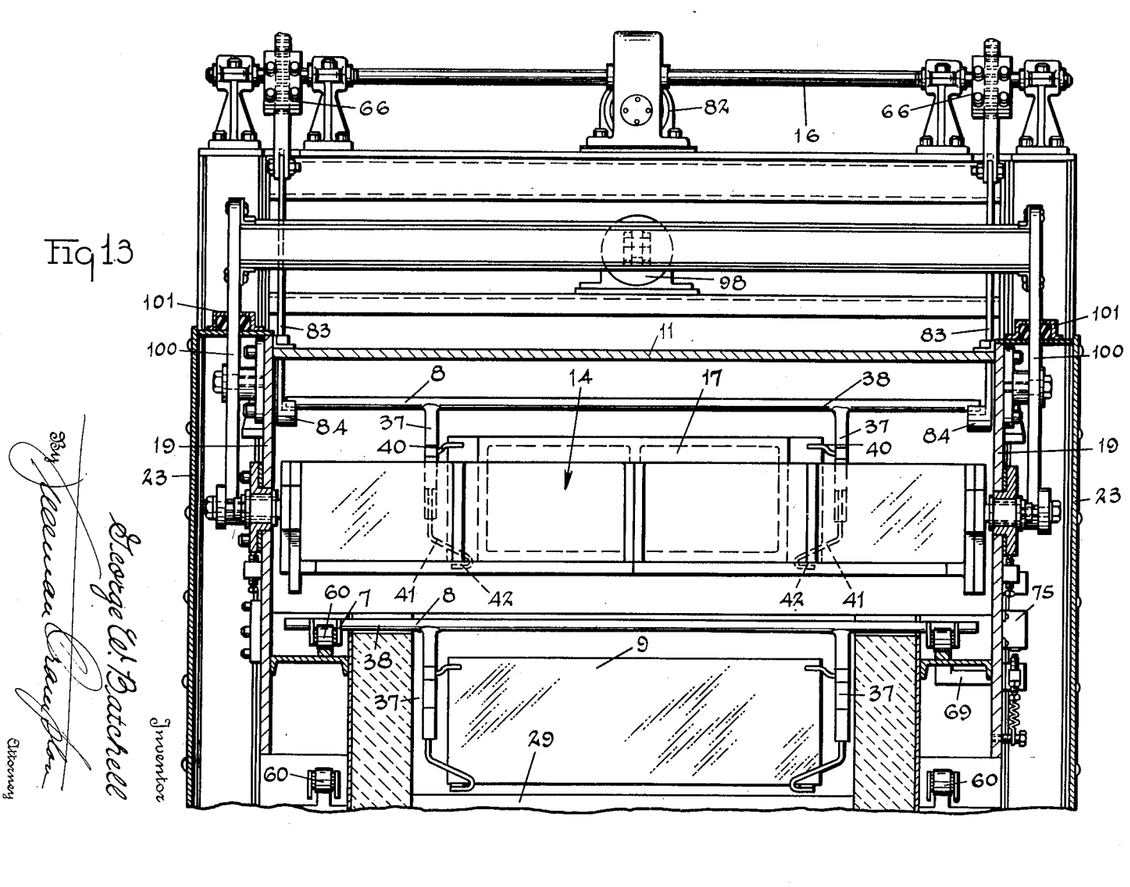
Fig. 13 is a section taken on the plane of the line 13—13 indicated in Fig. 11.

The transfer mechanism, indicated generally at 16 in the drawings, and provided in the apparatus selected, is best shown in Figs. 8, 11 and 12 of the accompanying drawings. Said transfer mechanism 16 is operated by a suitable reversible electric motor 82 mounted on the leer frame 2. The motor 82 drives a pair of pinions 86 through a suitable gear train and countershaft. The pinions 86 are each disposed in meshing relation with a rack bar 83 mounted for reciprocatory vertical movements in suitable pivotally supported straps 66 on opposite sides of the leer 1. When the motor 82 receives current causing rotation thereof in one direction, the rack bars 83 are caused to move upwardly, as from the position shown in Fig. 8 to the position shown in Fig. 11 of the accompanying drawings. When the motor 82 is caused to rotate in the other direction, the rack bars 83 move downwardly to the position shown in Fig. 8.

Each rack bar 83 has a lug 87 at its lower end which is adapted to ride in and be guided by a slot 85 formed in portions 96 of the wall 19, in the vertical reciprocation of the rack bar 83. The lower end of the slot 85 coincides with a point on said wall 19 below the plane of movement of said carrier cross bars 35 through the tunnel 6 while supported on the chains 7 and spaced horizontally from the plane of the face of wall 29 marking the inner end of the zone 15. The slot 85 extends from that lower point upwardly through a vertical extension and then inclinedly through a dog leg section to a point just above and in plane with the operating face of the die element 18. The slot 85 also has a branch part 110 which connects with slot 85 at the juncture of said vertical and dog leg sections of the slot 85 and extends inclinedly downward in a direction leading the direction of lineal movement of the chains 7. Said downwardly inclined branch section is connected with a vertically extending section which intersects the plane of support provided the cross bars 35 by the chains 7 at a point spaced from and ahead of the described lower point of origin of the slot 85. Preferably, said point of intersection occurs in close proximity to the vertical plane of the face of wall 29 defining the inner terminus of zone 15. Said vertical branch section is connected with a section which joins the main slot 85 at said lower point of origin. This relation is best shown in Fig. 11, as further illustrated by the section of wall 19 shown in Fig. 9. A switch 111 which is caused to operate by weight 112 is pivotally mounted at 114 and disposed at the juncture of the vertical and dog leg sections of slot 85. The switch 111 tends to divert movement into the branch slot 110. Thus, assuming the rack bars 83 to be in the position shown in Fig. 8 and that the motor 82 is energized to raise the bars 83, the lugs 87 of each rack bar will ride in main slots 85 upwardly through the vertical section, opening the switch 111 and then into the dog leg section to the upper terminus of said dog leg section. When the motor is energized to lower the rack bars, the lugs 87 of each bar will move downwardly through the dog leg section of slot 85 engaging switch 111 and be diverted into inclined section of branch slot 110 to move through said section and then through the vertical section thereof to finally return to the starting point of slot 85.

The rack bars 83 each have inwardly facing heads 84 best shown in Fig. 12 of the drawings. The heads 84 have yoke shaped surfaces adapted to engage the ends of the extensions 38 of cross bars 35 of carriers 8. Thus, as the motor 82 is energized, in proper sequence, the heads 84 of the rack bears engage the opposite ends of extensions 38 of a carrier 8 in the upward movement of the rack bars to lift the carrier and blank from the chains 7 and convey the carrier 8 and its supported blank 9 to the die element 18 for pressure forming between the die elements 17 and 18. Upon reversal of the motor 82, the heads 84 lower the carrier 8 and the now formed blank 9 downwardly and, as guided by branch slot 110, back to the chains 7 to engage the same yokes 36 on the chains 7 as those from which the carrier was first lifted, notwithstanding the steady forward movement of the chains in the glass forming interim. Almost immediately on replacement of the carrier 8 and formed blank 9 on the chains 7, the forward movement of the chains conveys the formed blank 9 into the intermediate zone 31 above the wall 29 for closely controlled chilling of 5° to fix the form imparted to the blank by the dies, without the establishment of fracture inducing strains. Thence, the carriers 8 with the formed blanks 9 move through zone 30 and through cooling portion 39 of zone 30 to the discharge or outlet end of the leer. At this point the formed blanks 9 may be removed from each carrier 8 and the carrier returned to the inlet end of the leer 1 by a carrier transfer and return mechanism.

*The carrier transfer and return mechanism*

The mechanism for returning the carriers 8 from the outlet to the inlet ends of the leer 1 includes a pair of return belt chains 13 which extend through passageway 12 of the leer. The chains are supported between sprockets 123 and 123' located at opposite ends of the leer, the sprockets of both chains at each end of the leer being connected by countershafts. One of said pair of sprockets is motor driven by a motor 115 to move the upper catenary portions of the chains 13 in a lineal direction from the outlet end toward the inlet end of the leer 1. The upper catenary portions of said chains are adapted to ride in tracks provided by channel bars 122 mounted on the frame 2 and extending the entire length of the leer 1. The chains 13 may have yoke parts similar to the parts 36 of chains 7 and adapted to engage the extensions 38 of the unloaded carriers 8 and convey them toward the inlet end of the leer for reloading and passage through the tunnel 6.

Figure 3:
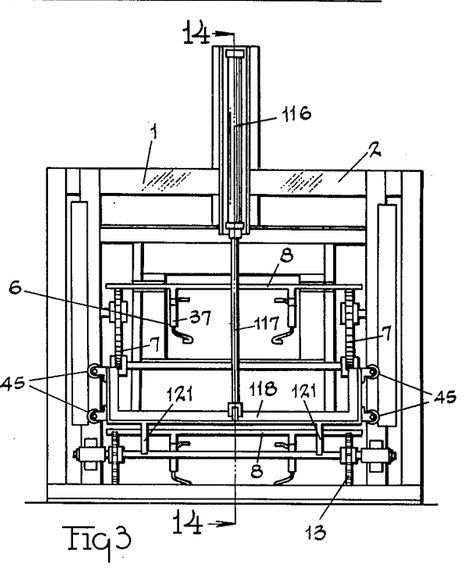
Fig. 3 illustrates the article delivery end of the leer.
Figure 14:
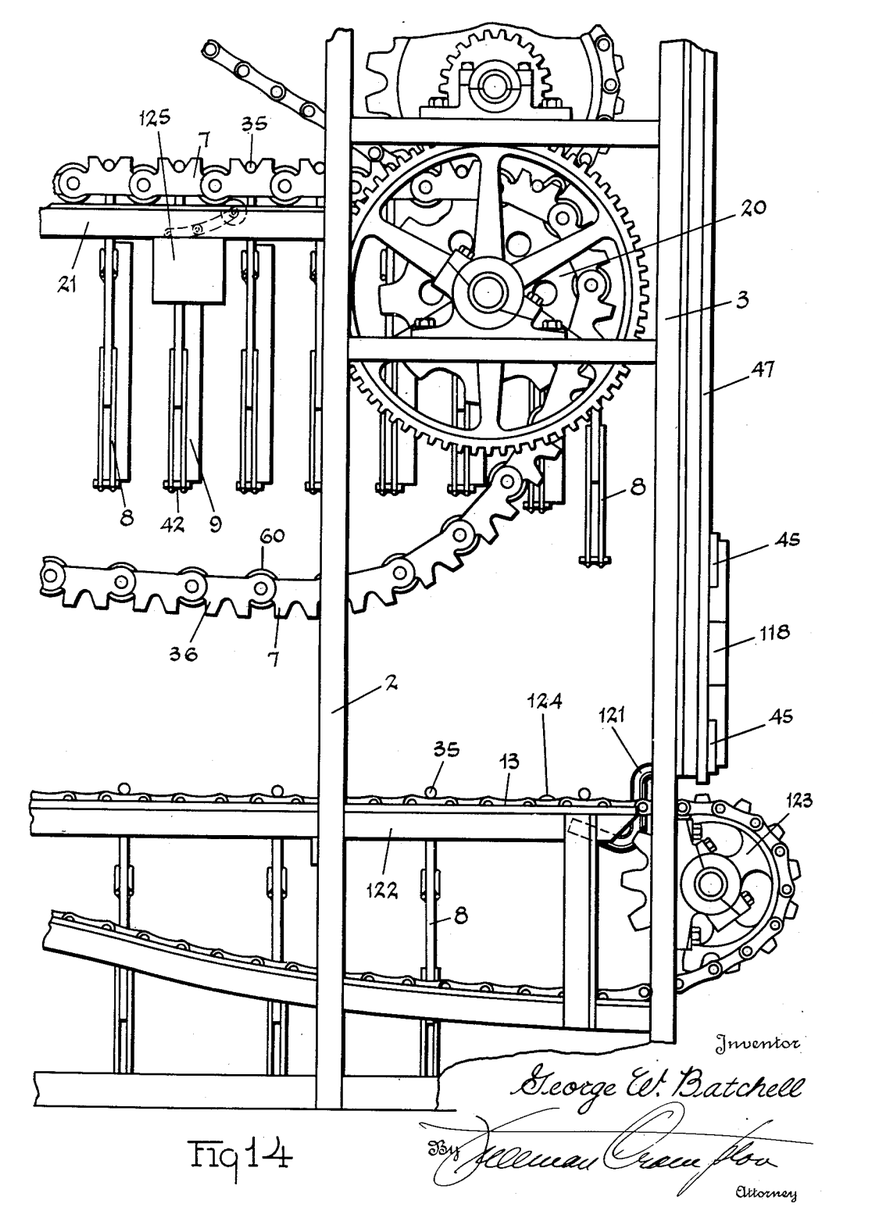
Fig. 14 is a side view of the conveying mechanism at the discharging end of the leer.

In order to transfer the carriers 8 from chains 7 to returning chains 13, I provide an automatically operative transfer mechanism shown in Figs. 3 and 14 of the drawings. The mechanism includes a hydraulic motor means, comprising cylinder 116 and its associated piston rod 117, and a vertically movable frame 118. The frame 118 has side rollers 45 which ride in vertically rising guide bars 47 fixed to the leer frame 2. The movement of the frame 118 is restricted by the bars 47 to movement in a plane substantially tangent to the sprockets 20 of the chains 7 at the discharge end of the leer and intersecting the lines of movement of the upper catenary portions of chains 13. The frame 118 is provided with a pair of hooks 121 adapted for engaging a cross bar 35 of a carrier. When the hydraulic motor means is operated in proper sequence, the piston 117 raises frame 118 from the position shown in Fig. 14 and causes the hooks 121 to raise under and engage a cross bar 35 of a carrier 8 as the carrier is being discharged from the chains 7 in passing over and around their respective sprockets 20. Thereupon, the hydraulic motor is reversely operated to lower the frame 118, until the end extensions 38 of the carrier engage the upper catenary portions of the chains 13 and are conveyed toward the inlet end of the leer 1.

Figure 1:
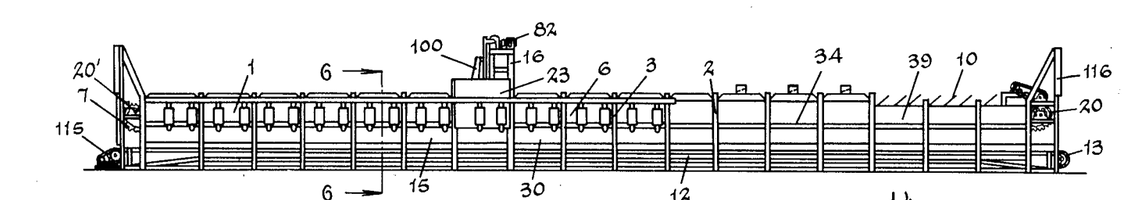
Fig. 1 of the drawings illustrates a side view of the leer.
Figure 2:
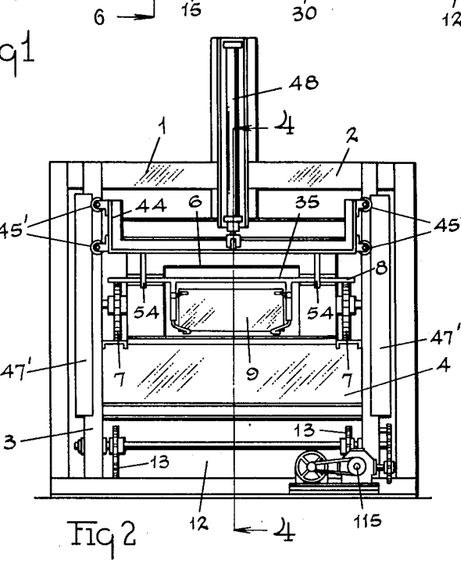
Fig. 2 illustrates the article receiving end of the leer.
Figure 4:
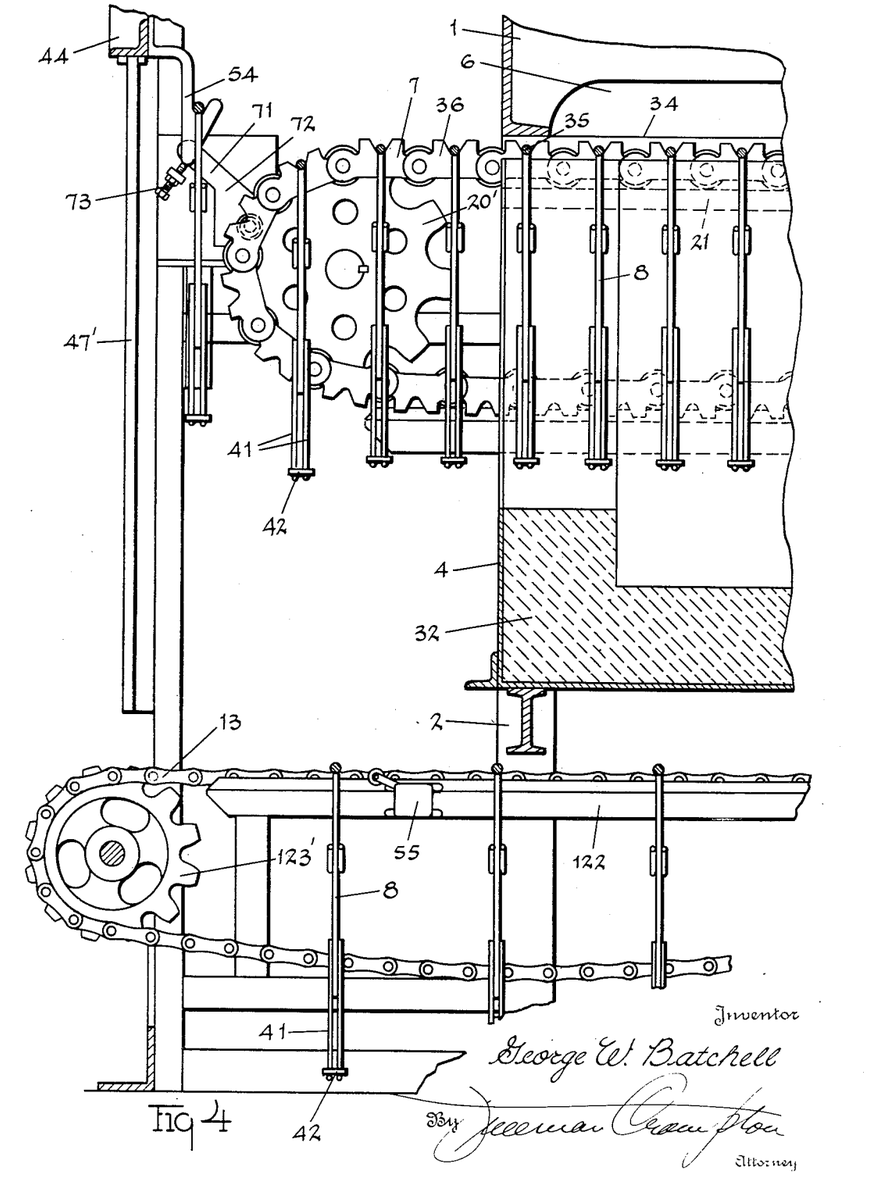
Fig. 4 is the side view of the glass conveying mechanism at the receiving end of the leer and a section taken on the plane of the line 4—4 indicated in Fig. 2.
Figure 5:
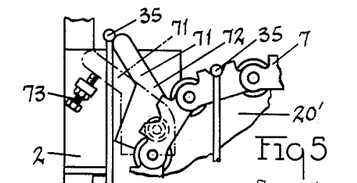
Fig. 5 illustrates a carrier guide.
Figure 6:
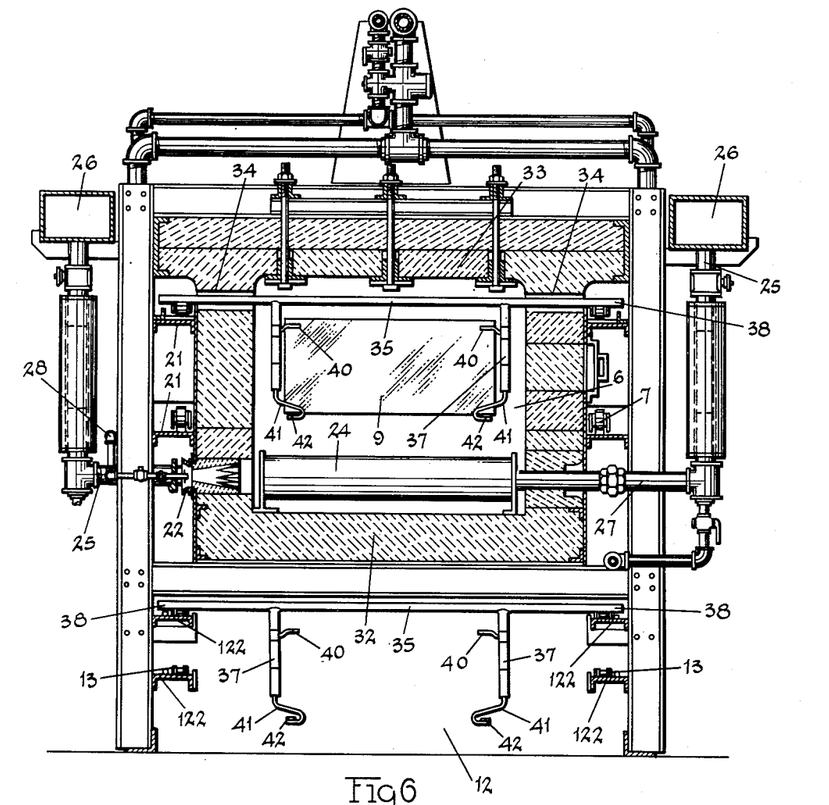
Fig. 6 is a view of a section of the leer taken on the plane of the line 6—6 indicated in Fig. 1.
Figure 7:
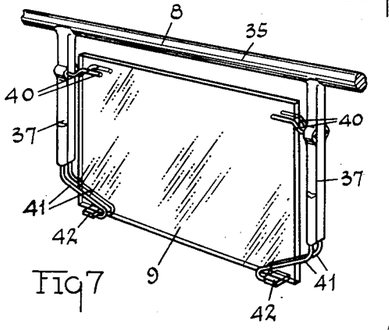
Fig. 7 is a perspective view of a carrier and a blank mounted thereon.

In order to replace the carriers 8 onto the chains 7 following their arrival at the inlet end of the leer 1 on the chains 13, I provide a second transfer mechanism at the inlet end of the leer 1. Said second transfer mechanism is best shown in Figs. 2 and 4 of the drawings and includes a hydraulic motor means, comprising a cylinder 48 and its piston 50, and a vertically reciprocable frame 44. The frame 44 has suitable rollers 45' which are adapted to ride upon vertically extending guide bars 47' mounted on the leer frame 2. The bars 47' support the frame 44 for reciprocation through a plane intersecting the path of movement of the upper catenary portions of chains 13 and tangential to the axis of rotation of the sprockets 20 at the inlet end of the leer. The frame 44 has a pair of hooks 54 which, when the frame 44 is positioned in its lowermost position by the piston 50 and is caused to move upwardly by the hydraulic motor means in proper sequence, move under the cross bar 35 of a carrier 8 and lift the carrier upwardly from the chains 13. Continued movement of the frame 44 carries the carrier to and above the plane of the upper catenary portions of chains 7 and above fingers 71 of a latch means 72, best shown in Figs. 4 and 5 of the drawings. The latch means 72 provides, in the fingers 71, a guide which is adapted to engage the cross bar 35 as the frame 44 is lowered from its uppermost position by operation of said hydraulic motor means. Said latch means 72 is pivotally mounted on the frame 2 and allows the cross bar 35 supported on the hooks 54 to pass, on the upward stroke of the frame 44, but, on the downward stroke of said frame, the latch means fingers 71 engage the cross bar 35 and allow the hooks 54 to disengage therefrom. The cross bar 35 being thus freed from the hooks 54, the carrier 8 is free to slide of its own weight along fingers 71 toward the chains 7. The fingers 71 guide the cross bars 35 so as to locate their ends 38 again in the yokes 36 of chains 7, in preparation for again passing through the tunnel 6. If desired, a suitable adjustable stop 73 may be mounted on the frame 2 to limit the movement of the latch means to a desired one of the character and extent described.

*Operating and control mechanism*

The hydraulic motors which actuate frames 44 and 118 and the opening and closing of die elements 17 and 18 are supplied with fluid under pressure from any suitable source of fluid pressure through a conduit 62. The sump of said source is connected by a return conduit 64 through which exhaust is made from said hydraulic motors.

Figure 15:
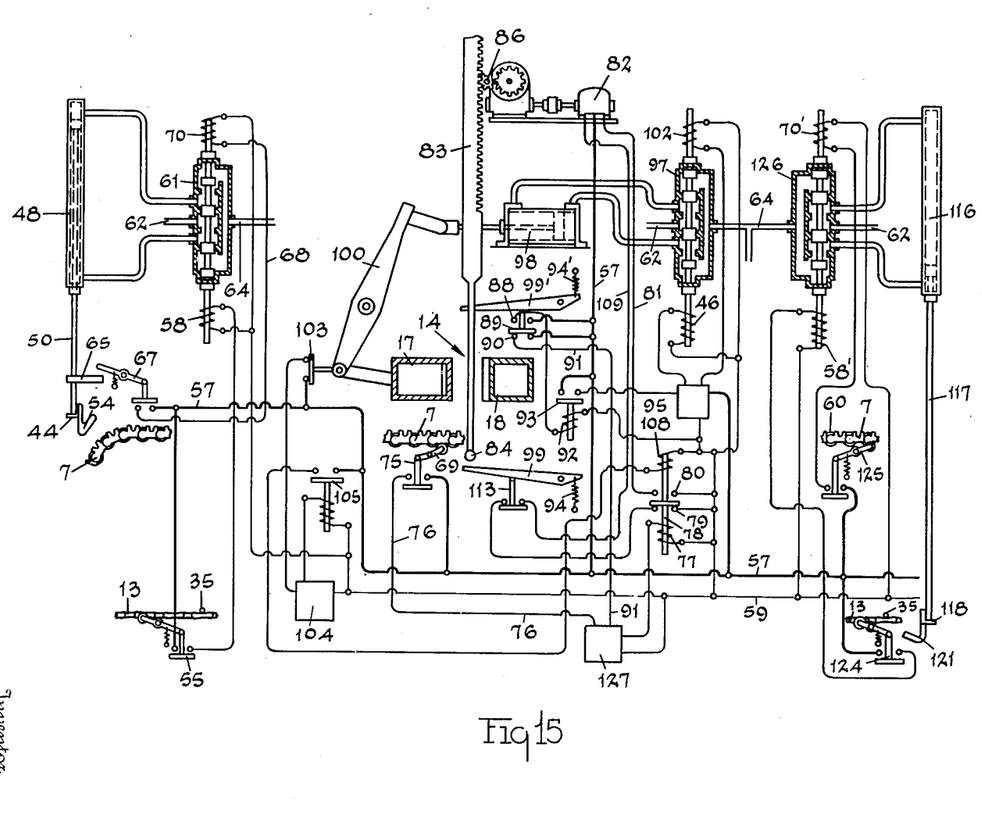
Fig. 15 is a diagram of parts of the apparatus and of the electric and switch connections for producing automatic control of parts of the apparatus.

Fluid to the hydraulic motor means of frame 44 including cylinder 48 is delivered from conduit 62 to a suitable two-position, four-way valve 61 illustrated diagrammatically in Fig. 15 of the drawings. The valve member of valve 61 when positioned in one position connects the upper end of cylinder 48 with pressure from conduit 62 and the lower end with the sump through exhaust conduit 64 to move the piston 50 and the connected frame 44 downwardly. When the valve is moved to its other position, reverse connections to and operation of the hydraulic motor means are obtained to move the frame 44 upwardly. Similarly, the two-position, four-way valve 126 controls flow to and from the cylinder 116 of the hydraulic motor means for operating frame 118, as described.

The flow of pressure fluid to the hydraulic motor means, actuating the movable die element 17 and including the cylinder 98, is controlled by a similar two-positioned four-way valve 97. When the valve member of valve 97 is in one position, pressure fluid is introduced in the right hand end (Fig. 15) of the cylinder 98 and the left hand end is connected to the sump. When so positioned, the hydraulic motor means is actuated to cause the movable die element 17 to close on the die element 18 and shape a blank located between the die elements. When the valve member of valve 97 is moved to its other position, reverse connections are established and operations effected causing the die element 17 to withdraw from the die element 18, allowing removal of the formed blank.

The movement of the valve members of valves 61, 97 and 126 is effected, preferably, by electric means which are in circuits with the electric motor 82 and by their relation assure synchronous and automatic cooperation of the various mechanisms previously described. The electric circuits, both power and control, are shown diagrammatically in Fig. 15 of the accompanying drawings.

Electric power is obtained from a source of electric current fed into the apparatus through main lines 57 and 59 from which various branch power and control lines, now to be described, extend.

The valve member of valve 61 is moved to each of its two said positions by one of two oppositely acting solenoids 58 and 70. The solenoid 58 is at all times connected to main line 59 and is adapted to be connected to main line 57 through a normally open switch 55. The operating arm of switch 55 is disposed adjacent the upper catenary portions of one of the chains 13 in a path to be tripped and cause closure of the switch by the passage of cross bar 35 of an empty carrier 8 being conveyed by said chains 13, as the carrier approaches the inlet end of the lever I. Closure of switch 55 energizes solenoid 58 causing the valve member of valve 61 to take a position causing frame 44 to ascend carrying a carrier 8, preceding the one actuating the switch, upwardly. The solenoid 70 is connected at all times in circuit with main line 59 and is adapted to be connected to main line 57 through line 68 and, upon closure, normally open switch 67. The operating arm of switch 67 is disposed in the path of a dog 65 mounted on piston rod 50. Upon engagement of said dog 65 with said arm of switch 67 closing said switch, the solenoid 70 is energized to move the valve member of valve 61 to its other position reversing the flow to cylinder 48 and causing the frame 44 to descend, unloading the carrier 8 it has just raised, as heretofore described, onto the fingers 71 for delivery to the chains 7 and returning toward the chains 13 for a carrier pick-up.

The valve member of the valve 126 is similarly operated by opposite acting solenoids 58' and 70'. The solenoid 58', being connected at all times to line 59, is connectable to line 57 through normally open trip switch 124. The operating arm of switch 124 is disposed in the path of cross bar 35 and riding on the upper catenary portions of chains 13 which are en route from the outlet end of the leer toward the inlet end thereof. Closing of switch 124 and energization of solenoid 58' causes the valve member of valve 126 to take a position causing fluid to flow to the upper end of cylinder 116, moving frame 118 downwardly to convey a carrier 8 from chains 7 to chains 13, as described. Solenoid 70' is connected to main line 57 through normally open switch 125 whose operating arm is disposed in the path of a carrier cross bar being conveyed on the chains 7 toward the outlet end of the leer so as to be tripped thereby. Energization of solenoid 70' causes the valve member of valve 126 to take its other position reversing the flow of fluid to the cylinder 116 and causing the frame 118 to rise and receive a carrier 8 on its hooks 121, as described.

The disposition of the switches 55, 67, 124 and 125 along the chains 7 and 13 and dog 65 on the rod 50 is such that the frames 44 and 118 will operate with orderly sequence and speed.

The reversible electric motor means 82 has two opposite windings both of which are connected with main line 57 and one of which is connected by line 81 and the other by line 109 to main line 59. The flow of current through line 81 causes the motor 82 to rotate in a direction raising the rack bars 83 and flow through line 109 causes the motor to rotate in a direction lowering the rack bars to raise and lower the carriers 8 and blanks as described. As shown in Fig. 15, the circuits are established by which the rack bar is en route downwardly, line 109 being connected through normally closed switch 113, solenoid operated motor switch 78 to line 59. Line 81 is energized upon movement of the motor switch 78 to close contacts 80.

The valve member of valve 97 controlling the flow to the hydraulic motor means of the die element 17 is moved to one or the other of its two positions by opposite acting solenoids 46 and 102. The circuits to each solenoid 46 and 102 are completed in desired sequence through a time relay 95.

With the parts in position shown in Fig. 15, the rack bars 83 are moving down. As the rack bars approach the end of their downward movement, the head 84 of one rack bar engages an operating arm 99 of switch 113 held in normally closing position by spring 94. Engagement of arm 99 by the descending head opens switch 113 and the circuit including line 109 to the motor 82, stopping the motor. By reason of the closure of switch 103 operated by rocker arm 100 which in a position in which the die element 17 is spaced from the element 18 time relay 104 is connected in circuit which connects the solenoid of switch 105 in circuit and causes closure of switch 105. The closing of switch 105 completes a circuit through solenoid 108 of solenoid operated motor switch 78. In the meantime, flow from time relay 127 through opposed solenoid 77 of the motor switch 78 has discontinued allowing solenoid 108 to shift the switch element of motor switch 78 to close contacts 80. As before stated, closure of contacts 80 completes a circuit to the motor 82 through line 81 and causes the motor to rotate in a direction raising the rack bars 83. As the bars raise, switch 113 is closed, with no effect on the circuits.

The rack bars continue to rise until head 84 engages the operating arm 99' of switch 89. The arm 99' is normally held by spring 94' in a position in which the switch 89 operated thereby closes across contacts 90 connecting line 57 to the time relay 127 by way of line 91. Engagement of said arm 99' by the head 84 moves switch 89 to close across contacts 88 closing a circuit through the solenoid 92 of switch 93 to close the same and establish a circuit to and through time relay 95. Solenoid 46 of valve 97 is then brought into energization, moving the valve member of valve 97 to cause flow of fluid to cylinder 98 to cause actuation of the die element 17. Upon movement of the rocker arm 100 induced by flow of fluid to cylinder 98, the circuit through switch 103 is opened and time relay 104 is cut from circuit allowing normally open switch 105 to open and deenergizing coil 108 of motor switch 78 allowing motor switch 78 to open circuit of line 81 and stop the motor 82. In the meantime, die element 17 has been closed and solenoid 102 energized causing reverse flow to cylinder 98 to open the dies 17 and 18.

At that time normally open switch 75 is actuated by its arm 69 which is adapted to be periodically engaged by rollers 60 on the upper catenary portions of a chain 7. Closure of switch 75 connects time relay 127 in circuit through line 76 causing current to flow through solenoid 77 actuating the now released motor switch element 78 to close contacts 79 and close a circuit through switch 113 and line 109 through the motor 82 to start its descent producing rotation. As the rack bars 83 descend, switch operating arm 99' through the constraint of spring 94' causes switch element 89 to open across contacts 88 thereby opening the circuit of coil 92 and allowing switch 93 to open circuit of time relay 95. At the same time switch element closes across contacts 90, assuring a continued current flow to time relay 127 and continued closure of contacts 79 by motor switch element 78. In such position, the downward movement of the rack bars continues to the point at which this discussion started, whereupon a new and following cycles are initiated.

The time relays 95, 104 and 127, indicated diagrammatically in the drawings, are well known in the art and may be of the type shown in United States Patents Nos. 710,146; 2,122,017; or 2,090,540.

*The operation*

Much of the operation of the apparatus and the method performed thereby has been made apparent by the foregoing description of the mechanisms and their controls. A brief and summary review will serve, however, to produce a more related picture of the overall functioning of the apparatus.

The glass blanks 9 are each placed in a carrier 8. Each carrier 8, with its blank 9, is then placed in successive relation on the moving upper catenary portions of chains 7 to be suspended therebetween from the respective cross bar 35 of each carrier. The carriers 8 and blanks 9 enter the inlet end of the tunnel 6 in transversing relation to the major longitudinal axis thereof. The tunnel dimension, in width, is preferably, but slightly greater than the space between the rods 37 of the carrier 8 and the dimension of the blank 9 supported therebetween, and only large enough to allow clearance for movement of the carriers and blanks without contact with the tunnel side walls. Thus, the suspended blanks 9 form a plurality of suspended and slowly moving baffles in the tunnel, as the blanks are moved therethrough. The moving blanks 9 also cooperate with the heating element to induce an upwardly moving current of hot air across the face of wall 29 most proximate to the inlet.

The valves controlling flow of fuel to the burners 22 and the valves controlling the exhaust from the cylinders 24 are individually adjusted so as to cause the cylinders, immediately adjacent the inlet end and the successive neighboring cylinders between the wall 29 and the inlet of the leer 1, to radiate a gradually increasing amount of heat. Said adjustments are such that the temperature of the air within the tunnel is increased from atmosphere temperature at the inlet end to a temperature in the space adjacent the face of wall 29 most proximate to said inlet end of the leer, at which the glass blanks 9, although rendered pliable still maintain blank shape and character. This temperature in certain glass is one approximating 1120° F. Thus, the air in the housing in which the glass shaping mechanism 14 is disposed will be at or close to said temperature, not only by reason of the heat radiation, but also by reason of the conveyed heat from the current of upwardly moving hot air across the face of the wall 29. The die elements 17 and 18 which are adapted to engage and shape the glass will be saturated with heat and be maintained at or near said temperature.

The lineal speed of the chains 7 is such that, as the blanks 9 are conveyed from the inlet end of leer 1 to the point of engagement of their respective carriers by the transfer mechanism 16, the time period of exposure to the air of gradually increasing temperature prevailing in high heat zone 15 of the tunnel 6 is sufficient to relax all parts of the blank and saturate the blank with heat, rendering the blank uniformly pliable. On arrival at the station for engagement of the respective carrier 8 by the transfer mechanism 16, the heads 84 of rack bars 83 engage the ends 38 of the carrier cross bar 35 and lift them from the yokes 36 on chains 7, in which they have been supported and resting. The carrier 8 and now pliable blank are conveyed upwardly, out of the moving conveyed line of following and preceding carriers, and blanks, to be placed so that the blank 9 is against the forming face of the die element 18 and the carrier parts 35, 37, 40, 41, and 42 enframe said face. The movable die element 17, whose actuation is initiated at the arrival of the blank 9 against the face of die element 18, then approaches, presses the blank to form and withdraws. The transfer mechanism motor 82 is then energized to cause lowering of the rack bars, as guided by the slots 85, the slot switch 111 and the branch slot 110. In response to the guiding action of the parts just mentioned, the heads 84 of the rack bars move downwardly in a different path than that followed in the upward movement, namely, one which intersects the line of extension of the chains at a point ahead of the place of removal of the carrier from the chains 7. Said point preferably coincides with that at which the yokes 36 of the chains 7 from which the carrier was lifted have just arrived in the lineal movement of the chains during the interim of blank transfer and shaping. Thus, the carrier is restored to its initial position relative to the chains 7 and following and preceding carriers and blanks, after shaping.

The shaped blank 9 has, by reason of its shaping, less inherent resistance to gravity induced distortion than the unshaped blank. Thus, if the formed blank is long maintained in the high heat of zone 15, the shaped blank will sag and become disformed. It is, therefore, of importance that the point at which the blank is returned to the chains 7 be so related to face of wall 29 determining the end of zone 15 that the blank receives and is exposed momentarily to the upwardly moving draft of hot air adjacent said face of the wall to compensate for the slight chilling produced in contact with the faces of the die elements 17 and 18 and then that the blank be immediately moved from the high heat zone 15 to an intermediately cooler zone 31 above the top edge of the wall 29. In the intermediate zone, there occurs a controlled form-fixing chilling of the formed glass blank, without producing fracture inducing strains. Good results have been obtained with a temperature drop through zone 31 of 5° F.

It will be observed that the formed blank in its relation to the wall 29 and tunnel 6 forms an effective baffle wall in the tunnel between zones 15, 31 and 30 which prevents movement of air from zones 30 to 31 or from zone 31 to zone 15.

As the formed blank emerges from zone 31 into the annealing zone 30, it is exposed to temperatures of lesser order than those prevailing in zone 15. Preferably, the adjustment of the burner valves and exhaust valves of the cylinders 24 in the zone 30 is made to produce, with the setting of the louvres 10, a degressively lower temperature in the tunnel 6 approaching the outlet end of the leer 1. In the specific example cited, the temperature adjacent the face of wall 29 most proximate to the outlet end of the leer is of the order of approximately 1115° F. The temperature at the outlet is such that the glass blank 9 may be readily handled in the atmosphere without danger.

The operation of the carrier return and transferring mechanism then automatically proceeds and a new cycle initiated.

While I have illustrated and described the best form of my invention now known to me, as required by the statutes, those skilled in the art will readily understand that changes may be made in the disclosed construction without departing from the spirit of my invention, as set forth in the appended claims.

I claim:

1. A method of shaping and annealing a plurality of glass blanks in individual continuous succession which comprises the steps of moving said plurality of blanks in one direction along a line through successively separate heating and annealing atmospheres, withdrawing one of said plurality of blanks from said line while said plurality of blanks are continued in their said movement, pressure shaping said withdrawn blank while said plurality of blanks are continued in their said movement, moving said shaped blank parallel to said line and in the direction of and while said plurality of blanks are continued in their said movement and placing said blank in said line in immediate neighboring relation to the blanks of said plurality of blanks with which said placed blank immediately neighbored at the time of withdrawal from said line.

2. The method of shaping and annealing a plurality of glass blanks as claimed in claim 1 in which the step of withdrawing the blank occurs while the blank is in the heating atmosphere and the step of placing said blank occurs proximate to the juncture of the heating and annealing atmosphere.

3. A method of shaping and annealing glass blanks which comprises the steps of placing a plurality of blanks in a substantially lineal order of sequence; moving the plurality of blanks in succession and while maintaining the substantially lineal order of sequence in and along a lineally extending zone of gradually increasing temperature to render the blanks pliable; removing each blank successively from the substantially lineal order of sequence of blanks at a point in the zone at which the temperature is less than the maximum temperature to which the zone increases, shaping the removed blank, returning the shaped blank to the same position in the substantially lineal order of sequence of blanks from which the blank was removed and at a point in the zone at which the temperature is greater than the temperature at the removal point; and moving the returned blanks in succession and while maintaining the substantially lineal order of sequence from said zone and into and along an adjoining lineally extending zone of gradually decreasing temperature to anneal the shaped blank, the steps of removing, shaping and returning each blank being effected while the remaining blanks are being moved in and between the mentioned zones whereby the flow of blanks in the zones to first render the blanks pliable and thereafter annealed proceeds at the same time as blank shaping is effected and the order of blanks in the zones is maintained.

4. A method of shaping and annealing glass blanks as claimed in claim 3 including the additional steps of moving the removed blank along one path prior to shaping and moving the shaped blank along another path following shaping and during return, the origin point of the first named path being spaced from the terminal point of the other path a distance equal to that through which the other blanks are moved during the removal, shaping and return of the blank.

5. A method of shaping and annealing glass blanks as claimed in claim 4 in which the moving of the removed blank along one path is effected in an upward direction relative to the other blanks and the moving of the shaped blank along the other path is effected in a downward direction relative to the other blanks.

6. A method of shaping and annealing glass blanks which comprises the steps of placing a plurality of blanks in an order of spaced sequence along a substantially horizontally extending line, a projection of which passes through adjoining separate progressively heating and annealing atmospheres; continuously moving the plurality of blanks in succession and while maintaining said order of spaced sequence along said line and through the heating atmosphere to progressively render the blanks pliable without loss of resistance to gravity induced deformation thereof; periodically moving the then leadmost blank of said plurality of blanks in an upward direction from said line along a path substantially normal thereto and originating at a point on the line and in the heating atmosphere where the temperature is less than the maximum temperature of the heating atmosphere; then bringing the last named blank to rest at a point remote from said line and in the heating atmosphere where the temperature is greater than the last named temperature; then engaging the last named blank while at rest to pressure shape the blank; then moving the last named blank in a downward direction and in part at least through another path having portions extending toward another point in the heating atmosphere and on said line and spaced from the originating point of the first named path a distance equal to that through which the other blanks moved during the mentioned upward movement, rest, engagement and downward movement of the blank to deliver the blank to said line in the same order of spaced sequence relative to preceding blanks that the blank and preceding blanks occupied before removal from said line; and continuously moving the delivered blanks from the heating atmosphere and into and through the annealing atmosphere whereby blank heating preparatory to shaping and annealing subsequent to shaping may progress as individual blanks are moved toward the place of shaping, are shaped and returned from the place of shaping.

7. A method of shaping and annealing a plurality of glass blanks which comprises the steps of moving the plurality of glass blanks along a line through adjoining heating and annealing zones; successively withdrawing each glass blank of the plurality of glass blanks from the line of moving glass blanks; engaging opposite sides of each withdrawn glass blank, shaping said blank and disengaging the opposite sides of said blank while the other glass blanks of the plurality of glass blanks are continued in their movement; and replacing each withdrawn glass blank in the line of moving glass blanks.

GEORGE W. BATCHELL.

REFERENCES CITED

The following references are of record in the file of this patent:

UNITED STATES PATENTS

| Number | Name | Date |
|---|---|---|
| 1,125,468 | Carnahan | Jan. 19, 1915 |
| 1,259,459 | Stile | Mar. 15, 1918 |
| 2,057,763 | Boyles et al. | Oct. 20, 1936 |
| 2,131,873 | Goodwillie | Oct. 4, 1938 |
| 2,176,999 | Miller | Oct. 24, 1939 |
| 2,251,159 | Owen | July 29, 1941 |
| 2,370,575 | Owen | Feb. 27, 1945 |
| 2,377,849 | Binkert et al. | June 12, 1945 |